May 5, 1970  H. O. BAGG  3,510,816
TEMPERATURE-DIFFERENTIAL PRESSURE SWITCH
Filed Jan. 6, 1969
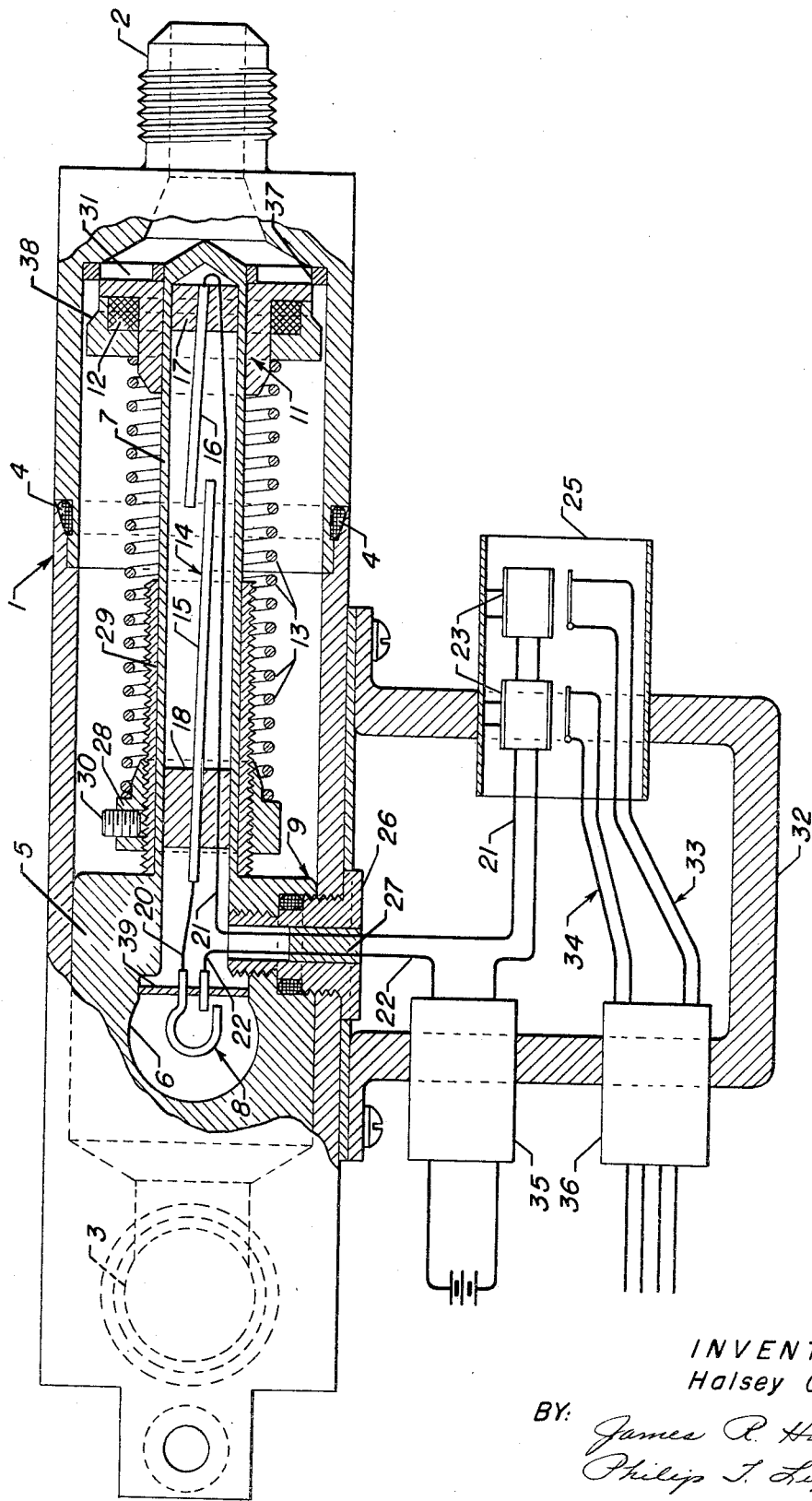
INVENTOR:
Halsey O. Bagg
BY: James R. Hootson, Jr.
Philip T. Liggett
ATTORNEYS United States Patent Office 3,510,816
Patented May 5, 1970

3,510,816
TEMPERATURE-DIFFERENTIAL PRESSURE
SWITCH
Halsey O. Bagg, Riverside, Conn., assignor to Universal
Oil Products Company, Des Plaines, Ill., a corporation
of Delaware
Filed Jan. 6, 1969, Ser. No. 789,318
Int. Cl. H01h 35/40, 36/02, 37/04
U.S. Cl. 337—2                                    7 Claims

ABSTRACT OF THE DISCLOSURE

A unitized temperature and differential pressure switch which opens an electric circuit when the temperature of a flowing liquid exceeds a predetermined temperature, or when the flow rate of the liquid falls below a minimum level and causes pressure drop in the switch to fall below a predetermined pressure drop, or when both of these conditions occur concurrently. The switch utilizes a thermostat electrically connected in series to a magnetically operable switch having contacts spring biased apart located in a hollow shaft which is longitudinal with respect to the direction of liquid flow. Positioned around the hollow shaft is a piston carrying a magnet, and a compression spring which biases the piston in an upstream direction. Under zero flow conditions the piston is upstream from the magnetically operable switch. As flow increases, the resulting increased pressure differential across the piston causes the piston to move downstream carrying the magnet with it. The magnetic field of the magnet causes actuation of the magnetically operable switch when the magnet draws close enough to the magnetically operable switch. From the piston, the liquid flows past the thermostat which keeps the circuit closed unless the temperature at the thermostat exceeds a critical predetermined temperature.

---

This invention relates to a unitized temperature and differential pressure switch which opens an electric circuit when the temperature of a flowing liquid exceeds a predetermined temperature, or when a reduced rate of flowing liquid causes the pressure differential in the switch to fall below a predetermined pressure differential, or when both of these conditions occur concurrently. More particularly, the switch utilizes a thermostat electrically connected in series to a magnetically operable switch having contacts spring biased apart located in a hollow shaft which is longitudinal with respect to the direction of liquid flow. Positioned around the hollow shaft is a piston carrying a magnet, and a compression spring which biases the piston in an upstream direction. When there is no flow through the switch, the piston is upstream from the magnetically operable switch. As flow increases, the resulting increased pressure differential across the piston causes the piston to move downstream carrying the magnet with it. The magnetic field of the magnet causes the magnetic switch contacts to close when the magnet is close enough to the magnetically operable switch. The liquid flows from the piston past the thermostat which keeps the circuit closed unless the temperature at the thermostat exceeds a predetermined critical temperature.

In the many existing forms of pressure switch designs, certain prior art constructions have utilized electrical switches which embody the use of magnetically operated "reed" switches or switch capsules, where at least one spring supported contact can be moved responsive to a magnetic field of appropriate strength. In pressure switches so designed, a normally open electromagnetic relay or switch means is connected in combination with a piston and compression spring arrangement so that the resulting unit is especially adapted to sense either an upper or a lower flow limit, or in some cases both. In other words there may be either a signal at a low pressure differential across the piston indicating a substantial absence of fluid flow in the processing unit being monitored, or a high pressure differential across the piston indicating that there is an excessive fluid flow in the unit.

Similarly, the use of thermostats is a common method of regulating liquid flow, both through mechanical and electrical regulation. In conventional thermostat regulating arrangements, an excessive or an inadequate temperature causes operation of a thermostat. In some regulating arrangements both an upper and a lower temperature limit of a flowing liquid exist. Heretofore, however, the parameters of both temperature and pressure have not been combined to regulate a liquid flow in a single instrument. Flow regulation is conventionally governed by either pressure or temperature, or pressure and temperature in successive regulating instruments.

In the present invention, however, flow limits are set at levels governed by both temperature and pressure using a novel unitary device. Thus, an electric current will pass through the magnetically operable temperature-differential pressure switch only below a predetermined temperature and only at or above a predetermined pressure. It can be seen that with a constant pressure, which only occurs at a constant flow rate, the temperature of the flowing liquid may rise and cause an open circuit to occur in the electrical circuit of the switch. Similarly, if a liquid of constant temperature passes through the switch at an inadequate flow rate, the pressure differential will drop sufficiently to cause an open circuit.

Quite frequently the current passed through the thermostat and magnetically operable switch of this invention is used to operate an alarm system to indicate that an abnormal or unsafe condition exists. Because only a small amount of current can be passed to the magnetically operable "reed" switch, as previously described, the switch circuit of this invention is often used as an input signal to a switch for an electric circuit carrying a much greater current. When utilized in this manner, the temperature-differential pressure switch includes an amplifying relay in electrical series with the thermostat and the magnetically operable switch. The armature of this relay is a switch in a separate electrical circuit.

It is the primary object of this invention, to provide a temperature-differential pressure switch which regulates the flow of a liquid to a minimum flow rate and a maximum temperature.

It is a further object to provide a single device with which to sense both temperature and pressure conditions in a liquid flow.

One application where it is of vital importance to keep at least a minimum liquid flow below a specified temperature is in the cooling system of an aircraft engine. In this instance, an excessive coolant temperature or an entire or partial flow blockage must be noticed and corrected immediately. In this and other applications it is important to control both temperature and pressure in a liquid flow. This is most economically accomplished with a single unit which activates both temperature and pressure alarms or which initiates action to correct both temperature and pressure conditions of a liquid flow.

In a broad aspect this invention is a unitized temperature and differential pressure switch operating below a predetermined temperature and above a predetermined pressure differential, which comprises in combination: a tubular pressure tight shell having a fluid inlet at one end thereof and a fluid outlet at the opposing end thereof; a core longitudinally disposed within said shell and comprising a thermostat housing portion, having a thermostat cavity, and a hollow shaft portion longitudinally extending from said thermostat housing portion and terminating at the fluid inlet end of said shell; a thermostat positioned in said thermostat cavity; a movable annular piston positioned around said hollow shaft portion of said core; a magnet carried by said piston; a compression spring around said hollow shaft portion of said core downstream from said piston and biasing said piston toward said fluid inlet end of said shell; a magnetically operable electric switch centrally located within said hollow shaft portion of said core and having longitudinally extending contact points biased in an open position; and electrical connectors connecting said electric switch and said thermostat in a series circuit to an electric current source, whereby a fluid flow at the fluid inlet in said shell producing at least the predetermined pressure differential across said piston causes the aforesaid contact points to close, and a temperature at said thermostat less than the predetermined temperature causes the thermostat to close the aforesaid circuit. It is entirely possible for the electric leads connecting the thermostat and the magnetically operable switch to the current source to pass out through the fluid outlet, and to be subsequently separated from the liquid flow. However, a preferred modification of this invention employs a positioning peg which has an axial passageway therethrough and which extends transversely through the wall of the shell into the thermostat cavity in the thermostat housing portion of the core. This peg laterally and longitudinally restrains the core within the shell. The peg also provides an access to the interior of the switch, whereby electrical connectors pass through the axial passageway of the peg and connect the thermostat and the magnetically operable switch to an electric current source.

A desirable feature which can be incorporated into this invention is a construction wherein the critical pressure differential is adjustable. In an unmodified embodiment of this temperature-differential pressure switch having a fixed critical pressure differential, the compression spring is normally longitudinally restrained at its downstream end by the thermostat housing portion of the core from which the hollow shaft portion of the core extends. To obtain the feature of pressure adjustability the downstream position of the support of the compression spring is varied. One manner of making the downstream compression spring support adjustable is by utilizing an adjustable retaining ring positioned around the hollow shaft portion of the core downstream from the compression spring. An effective design of such an adjustable retaining ring embodies a sleeve having a threaded outer surface and which is rigidly fixed upon the hollow shaft portion of the core. The adjustable retaining ring has mating threads and is threadably engaged to the sleeve. A set screw is threaded transversely through the retaining ring, thereby securely longitudinally positioning the retaining ring with respect to the sleeve.

The design of the piston is particularly influential as regards the stability and accuracy of the operation of this invention. The hollow shaft and piston are centered in a cylinder formed by the inner walls of the pressure tight shell. The piston diameter is slightly smaller than the cylinder diameter so that an annular passageway is formed through which liquid flows from the shell inlet to the shell outlet. This annular passageway is small enough so that a pressure drop does exist from the inlet side to the outlet side of the piston. The piston is preferably designed so that the border of the piston adjacent to the annular passageway has only a very short longitudinal dimension. The shorter this dimension, the less will be the impediment to liquid flow due to the viscosity of the liquid at the boundary between the piston and the inner walls of the pressure tight shell. If the longitudinal dimension of the piston were too great, and the temperature of the flowing liquid were low, thus making the liquid more viscous, an abnormally large pressure differential would develop across the piston. In a case such as this, the viscosity of the liquid could virtually prevent the liquid from flowing yet would still maintain a sufficient pressure differential across the piston to force the piston sufficiently far downstream against the opposing force of the compression spring whereby the magnet would continue to hold the contact points of the magnetically operable switch closed. The circuit would thus be closed, yet the flow of liquid would be so small as to warrant an alarm or require corrective action. To solve this problem, the piston is preferably constructed with a truncated conical section having a downstream base and terminating near the inner walls of the shell. This construction provides the piston with sufficient mass for structural soundness while limiting to a thin edge the longitudinal area of the piston exposed to the problems caused by the viscosity of the flowing liquid.

The various features of the temperature-differential pressure flow switch are illustrated in the accompanying drawing which is a sectional elevational view of the preferred embodiment of this invention with all electrical contacts in the switch circuit depicted in an open condition and all electrical contacts of other circuits in a closed condition.

Referring now to the drawing, there is shown a tubular pressure tight shell 1. Shell 1 is formed by an outlet half and an inlet half. The outlet half slides over a short section of the inlet half and the two halves are made pressure tight by virtue of a gasket 4 at their interface. Shell 1 has a fluid inlet 2 at one end thereof and a fluid outlet 3 at the opposing end thereof. A core 9 is longitudinally disposed within shell 1 and is comprised of a thermostat housing portion 5, having a thermostat cavity 6, and a hollow shaft portion 7, longitudinally extending from thermostat housing portion 5 and terminating at the fluid inlet end of shell 1. A positioning peg 26, with an axial passageway extending therethrough, extends through the wall of shell 1 into thermostat cavity 6 in thermostat housing portion 5 of core 9, thereby laterally and longitudinally restraining core 9 within shell 1. Electrical connectors 21 and 22 pass through the axial passageway in positioning peg 26 and connect a thermostat 8 and a magnetically operable switch 14 to an electric current source. A rubber plug 27 is located in the axial passageway of positioning peg 26 to make peg 26 fluid tight while still allowing the electrical leads 21 and 22 to pass from the interior of the temperature-differential pressure switch to an electric current source. Peg 26 is threadably engaged to both housing 1 and core 9. A thermostat 8 is positioned in thermostat cavity 6. Thermostat 8 comprises a stationary contact and a bimetal strip initially curved at ambient temperature, and which tends to straighten out when heated excessively. Thermostat 8 is held in place within cavity 6 by a partition 39. Partition 39 is liquid tight, thereby preventing the liquid, which flows in contact with the thermostat in part of thermostat cavity 6, from contacting the adjacent electric leads and the magnetically operable switch 14. A movable annular piston 11 is positioned around hollow shaft portion 7 of core 9. Piston 11 has a truncated conical section 38 having a downstream base and terminating near the inner walls of shell 1. Piston 11 carries a magnet 12 in its various longitudinal movements. A compression spring 13 is positioned around hollow shaft portion 7 of core 9 downstream from piston 11 and biasing piston 11 toward the fluid inlet end of shell 1. Downstream from compression spring 13 is a sleeve 29 which has a threaded outer surface and which is rigidly fixed around hollow shaft portion 7 of core 9. An adjustable retaining ring 28 is positioned around sleeve 29 and has mating threads and is threadably engaged to sleeve 29. A set screw 30 is threaded transversely through the retaining ring 28, thereby securely longitudinally positioning retaining ring 28 with respect to sleeve 29. The adjustable retaining ring 28 can thereby be moved longitudinally to adjust the bias which compression spring 13 exerts against piston 11. An annular support 31 is secured around the upstream extremity of hollow shaft portion 7 of core 9, thereby stabilizing hollow shaft portion 7 within shell 1 and limiting the upstream movement of piston 11. Annular support 31 is perforated by numerous perforations 37 to allow a liquid flow therethrough. A magnetically operable electric switch 14 is centrally located within hollow shaft portion 7 of core 9 and has longitudinally extending contact points 15 and 16 which are normally biased in an open position. Electrical connector 20 connects magnetically operable switch 14 to thermostat 8. Electrical connecting leads 21 and 22 connect magnetically operable switch 14 and thermostat 8 and relays 23 in series to an electric current source. A liquid flow at liquid inlet 2 in shell 1 which produces at least the predetermined pressure differential across piston 11 causes contacts 15 and 16 to close. A temperature at thermostat 8 less than the predetermined temperature also causes thermostat 8 to close the aforesaid circuit. Relays 23 are enclosed by a relay canister 25 which is inserted into relay housing 32. Relay housing 32 is secured to the wall of shell 1 and encompasses that portion of positioning peg 26 appearing at the outer surface of shell 1. The armatures of relays 23 comprise switches in separate electrical circuits 33 and 34. These circuits leave the relay housing through an interface 36 which is force fitted into relay housing 32. Similarly, the leads connecting the electrical circuit of the temperature-differential pressure switch to the power source leave the relay housing 32 through an interface plug 35, which is also force fitted into relay housing 32.

In the operation of the temperature-pressure differential switch, a liquid passes into shell 1 through liquid inlet 2. The liquid passes through perforations 37 of annular support 31 and exerts a pressure on piston 11. By exerting this pressure on piston 11, the liquid forces piston 11 back against the bias of compression spring 13. An increased liquid flow enhances the pressure differential and piston 11 is forced further and further away from the inlet end of shell 1. The contact points 15 and 16 of the magnetically operated "reed" switch 14 are normally open by virtue of a cantilever spring support means provided for at least one of contact points 15 and 16. Contact points 15 and 16 are capable of being forced into a closed contact position by the action of a suitable strength magnetic field around the capsule at the zone of contact points 15 and 16. The encasement for switch 14 is normally glass, but may be of any other non-magnetic material. When piston 11 brings magnet 12 into close proximity to magnetically operable switch 14, the magnetic field of magnet 12 acts on contacts 15 and 16 to force them together, thereby closing the circuit through the magnetically operable switch 14. When the pressure at the fluid inlet 2 decreases sufficiently, the compression spring 13 forces piston 11 back toward inlet 2. The movement of piston 11, and consequently magnet 12, decreases the influence of the magnetic field on switch 14, whereby contacts 15 and 16 spring back to their normally open positions.

The liquid flows through the annular passageway between the truncated conical section 38 of piston 11 and the inner wall of shell 1. Thermostat 8 is in contact with the liquid flowing past it, and when the temperature increases beyond the critical point, thermostat 8 opens the circuit. If there is either too great a temperature at thermostat 8, or too small a pressure differential across piston 11, the series circuit connecting thermostat 8 and magnetically operable switch 14 will be broken. In the embodiment illustrated, an opening of the circuit operating the temperature-differential pressure switch will cause the armatures of the relays 23 to fall back to their natural positions, thereby actuating the separate circuits 33 and 34, which can be used to sound alarms or start auxiliary coolant pumps. Current will not flow in the temperature-differential pressure switch again until both the minimum pressure and a temperature below the maximum temperatures are reached.

The foregoing detailed description of the preferred embodiment of this invention has been given for clearness of understanding only, and no unnecessary limitations should be construed therefrom, as other modifications will be obvious to those skilled in the art.

I claim as my invention:

1. A unitized temperature and differential pressure switch operating below a predetermined temperature and above a predetermined pressure differential, which comprises in combination:
   (a) a tubular pressure tight shell having a fluid inlet at one end thereof and a fluid outlet at the opposing end thereof,
   (b) a core longitudinally disposed within said shell and comprising a thermostat housing portion, having a thermostat cavity, and a hollow shaft portion longitudinally extending from said thermostat housing portion and terminating at the fluid inlet end of said shell,
   (c) a thermostat positioned in said thermostat cavity,
   (d) a movable annular piston positioned around said hollow shaft portion of said core,
   (e) a magnet carried by said piston,
   (f) a compression spring position around said hollow shaft portion of said core downstream from said piston and biasing said piston toward said fluid inlet end of said shell,
   (g) a magnetically operable electric switch centrally located within said hollow shaft portion of said core and having longitudinally extending contact points biased in an open position, and
   (h) electrical connectors connecting said electric switch and said thermostat in a series circuit to an electric current source whereby a fluid flow at the fluid inlet in said shell producing at least the predetermined pressure differential across said piston causes the aforesaid contact points to close, and a temperature at said thermostat less than the predetermined temperature causes the thermostat to close the aforesaid circuit.

2. The temperature and differential pressure switch of claim 1 further characterized in that an adjustable retaining ring is positioned around said hollow shaft portion of said core downstream from said compression spring.

3. The temperature and differential pressure switch of claim 2 further characterized in that a sleeve having threaded outer surface is rigidly fixed around said hollow shaft portion of said core, and said adjustable retaining ring has mating threads and is threadably engaged to said sleeve, and a set screw is threaded transversely through said retaining ring, thereby securely longitudinally positioning said retaining ring with respect to said sleeve.

4. The temperature and differential pressure switch of claim 1 further characterized in that a perforated annular support is secured around the upstream extremity of said hollow shaft portion of said core, thereby stabilizing said hollow shaft portion within said shell and limiting the upstream movement of said piston.

5. The temperature and differential pressure switch of claim 1 further characterized in that said piston has a truncated conical section with a downstream base terminating near the inner walls of said shell.

6. The temperature and differential pressure switch of claim 1 further characterized in that a positioning peg, having an axial passageway therethrough, extends transversely through the wall of said shell into said thermostat cavity in said thermostat housing portion of said core, thereby laterally and longitudinally restraining said core within said shell, and thereby providing an axial passageway through which electrical connectors pass in connecting said thermostat and said magnetically operable switch to an electric current source.

7. The temperature and differential pressure switch of claim 6 further characterized in that relays are connected in electrical series with said thermostat and said magnet switch, and said relays are mounted in a relay housing which is secured to the wall of said shell and encompasses the portion of said positioning peg appearing at the outer surface of said shell, whereby the armatures of said relays comprise switches in separate electric circuits.

References Cited

UNITED STATES PATENTS

| | | |
|---|---|---|
| 3,342,959 | 9/1967 | Breunich _____ 335—205 XR |
| 2,945,928 | 7/1960 | Houser _____ 335—145 XR |
| 2,892,051 | 6/1959 | Moore. |

BERNARD A. GILHEANY, Primary Examiner

D. M. MORGAN, Assistant Examiner

U.S. Cl. X.R.

200—81.9; 335—205